United States Patent
Li et al.

(10) Patent No.: US 10,387,717 B2
(45) Date of Patent: Aug. 20, 2019

(54) INFORMATION TRANSMISSION METHOD AND TRANSMISSION APPARATUS

(71) Applicant: HUAWEI TECHNOLOGIES CO., LTD., Shenzhen (CN)

(72) Inventors: Xiaojuan Li, Beijing (CN); Zhu Liu, Shenzhen (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/129,148

(22) PCT Filed: Jul. 2, 2014

(86) PCT No.: PCT/CN2014/081457
§ 371 (c)(1),
(2) Date: Sep. 26, 2016

(87) PCT Pub. No.: WO2016/000219
PCT Pub. Date: Jan. 7, 2016

(65) Prior Publication Data
US 2017/0154210 A1  Jun. 1, 2017

(51) Int. Cl.
*G06K 9/00* (2006.01)
*G06F 16/58* (2019.01)
(Continued)

(52) U.S. Cl.
CPC ......... *G06K 9/00315* (2013.01); *G06F 16/00* (2019.01); *G06F 16/58* (2019.01);
(Continued)

(58) Field of Classification Search
None
See application file for complete search history.

(56) References Cited

U.S. PATENT DOCUMENTS

2009/0055185 A1  2/2009  Nakade et al.
2009/0150155 A1*  6/2009  Endo .................. G10L 15/04
                                                    704/255
(Continued)

FOREIGN PATENT DOCUMENTS

CN  102307292 A  1/2012
CN  102662961 A  9/2012
(Continued)

OTHER PUBLICATIONS

Yan Li et al. "Speech-Driven Cartoon Animation with Emotions," Proceedings/ACM Multimedia 2001, MM'01, Ottawa, Canada, Sep. 30-Oct. 5, 2001, pp. 365-371.
(Continued)

*Primary Examiner* — Fred H Hu
(74) *Attorney, Agent, or Firm* — Conley Rose, P.C.

(57) ABSTRACT

Embodiments of the present invention disclose a transmission method, where the method includes: starting a session between a terminal and a peer terminal; detecting whether information transmitted in the session satisfies a trigger condition; and if the information satisfies the trigger condition, acquiring an image, and sending the image to the peer terminal, where the information transmitted in the session includes text information or voice information. According to the present invention, information transmission efficiency can be improved.

10 Claims, 4 Drawing Sheets

(51) Int. Cl.
*G10L 25/63* (2013.01)
*H04L 12/58* (2006.01)
*G06F 16/00* (2019.01)

(52) U.S. Cl.
CPC .......... *G06K 9/00664* (2013.01); *G10L 25/63* (2013.01); *H04L 51/00* (2013.01); *H04L 51/10* (2013.01)

(56) References Cited

U.S. PATENT DOCUMENTS

| | | | |
|---|---|---|---|
| 2010/0177116 | A1 | 7/2010 | Dahllof et al. |
| 2012/0157200 | A1* | 6/2012 | Scavezze ............... H04N 5/225 463/31 |
| 2013/0103766 | A1* | 4/2013 | Gupta .................. G06Q 10/107 709/206 |
| 2013/0194280 | A1 | 8/2013 | Kwon et al. |
| 2013/0307997 | A1 | 11/2013 | O'Keefe et al. |
| 2014/0070965 | A1* | 3/2014 | Letsu-Dake ........... G01C 23/00 340/971 |
| 2014/0220526 | A1* | 8/2014 | Sylves ............... G06Q 30/0201 434/238 |
| 2015/0046371 | A1* | 2/2015 | Leary ................. G06Q 30/0282 705/347 |
| 2015/0332088 | A1* | 11/2015 | Chembula ................ G06K 9/00 382/203 |
| 2016/0050169 | A1* | 2/2016 | Ben Atar .......... H04M 1/72544 709/206 |
| 2016/0191958 | A1* | 6/2016 | Nauseef ........... H04N 21/23418 725/116 |

FOREIGN PATENT DOCUMENTS

| | | |
|---|---|---|
| CN | 102664825 A | 9/2012 |
| CN | 102842033 A | 12/2012 |
| CN | 103823561 A | 5/2014 |
| CN | 103886632 A | 6/2014 |
| JP | 2008053826 A | 3/2008 |
| JP | 2008287697 A | 11/2008 |
| JP | 2011138343 A | 7/2011 |
| JP | 2011192306 A | 9/2011 |
| JP | 2013156985 A | 8/2013 |
| KR | 20110023524 A | 3/2011 |
| KR | 20120108485 A | 10/2012 |
| KR | 20130104607 A | 9/2013 |
| WO | 2010078972 A2 | 7/2010 |

OTHER PUBLICATIONS

Feng Yu et al., "Emotion Detection from Speech to Enrich Multimedia Content" In: "Network and Parallel Computing," Nov. 20, 2001, Springer International Publishing, Cham 032548, vol. 2195, pp. 550-557.

International Search Report (including English translation) issued in corresponding International Application No. PCT/CN2014/081457, dated Mar. 30, 2015, 10 pages.

Extended European Search Report issued in corresponding EP Application No. 14896798, dated Feb. 6, 2017, 9 pages.

Notice to Submit a Response (including English translation) issued in corresponding Korean Patent Application No. 10-2016-7028327, dated Nov. 28, 2017, 9 pages.

Notice of Reasons for Rejection (including English translation) issued in corresponding Japanese Patent Application No. 2016-558101, dated Aug. 29, 2017, 6 pages.

\* cited by examiner

INFORMATION TRANSMISSION METHOD AND TRANSMISSION APPARATUS

CROSS-REFERENCE TO RELATED APPLICATION

This application is a national stage of International Application No. PCT/CN2014/081457, filed on Jul. 2, 2014, which is hereby incorporated by reference in its entirety.

TECHNICAL FIELD

The present invention relates to the communications field, and in particular, to an information transmission method and a transmission apparatus.

BACKGROUND

With development of the society, there is increasing interaction between people, between people and mobile devices, and between people and computers. The interaction between people, between people and mobile devices, and between people and computers is generally performed in a session form. The session is an uninterrupted sequence of requests and responses. The session includes multiple types of information, for example, voice information, text information, and image information. A single-information transmission manner is a most commonly used transmission manner, which is easy to operate, and has a relatively low requirement on system performance. However, information transmitted in a single-channel transmission manner is relatively monotonous, and cannot comprehensively and accurately convey a thought of a user. For example, when a user chats by using a chat tool or a social tool, the user generally chats by using texts, but emotion of the user cannot be comprehensively and accurately conveyed with only the texts.

A multi-information transmission manner overcomes the shortcoming of the single-information transmission manner to some extent, but the user needs to manually insert other information when using a piece of information, which is cumbersome to operate. For example, the user adds an emoticon during a text chat, and according to the prior art, the user needs to first manually search an emoticon library for a proper emoticon image, and then add the emoticon image to a chat session. Because the emoticon library has a finite quantity of emoticons, it is probably that the user cannot find a proper emoticon image to convey a mood of the user. If the user talks about some scenic spots, food, weather, an environment the user stays, and the like, the user also cannot show these to the other party in real time. It can be seen that an existing multichannel interaction manner is cumbersome to operate, and information transfer efficiency is relatively low.

SUMMARY

Embodiments of the present invention provide a transmission method, which can improve information transmission efficiency.

To resolve the foregoing technical problem, the embodiments of the present invention disclose the following technical solutions:

According to one aspect, an information transmission method is provided, where the method includes:
starting a session between a terminal and a peer terminal;
detecting whether information transmitted in the session satisfies a trigger condition; and
if the information satisfies the trigger condition, acquiring an image, and sending the image to the peer terminal, where the information transmitted in the session includes text information or voice information.

With reference to the first aspect, in a first possible implementation manner of the first aspect, the detecting that the information transmitted in the session satisfies the trigger condition includes:
detecting that a speaking speed in the voice information is greater than or equal to a first threshold, or detecting that a speaking speed in the voice information is less than or equal to a second threshold, or detecting that an intonation in the voice information is greater than or equal to a third threshold, or detecting that an intonation in the voice information is less than or equal to a fourth threshold; and
the acquiring an image includes acquiring an emoticon image.

With reference to the first aspect, in a second possible implementation manner of the first aspect, the detecting that the information transmitted in the session satisfies the trigger condition includes: detecting a key word in the text information, or detecting a key word in the voice information; and
the acquiring an image includes acquiring an emoticon image, or acquiring an image corresponding to the key word, or acquiring an environmental background image.

With reference to the first possible implementation manner of the first aspect or the second possible implementation manner of the second aspect, in a third possible implementation manner of the first aspect, when the acquiring an emoticon image is performed, the acquiring an emoticon image includes:
capturing a current facial expression of a user; and
acquiring an emoticon image according to the facial expression.

With reference to the third possible implementation manner of the first aspect, in a fourth possible implementation manner of the first aspect, the acquiring an emoticon image according to the facial expression includes:
analyzing emotion corresponding to the facial expression; and
acquiring a cartoon-form emoticon image corresponding to the emotion, or generating, according to the emotion, a facial feature corresponding to the emotion, and adding the facial feature to a preset facial image, to acquire an emoticon image.

With reference to the second possible implementation manner of the first aspect, in a fifth possible implementation manner of the first aspect, when the acquiring an image corresponding to the key word is performed, the acquiring an image corresponding to the key word includes:
searching for an image according to the key word; and
acquiring, according to the found image, an image corresponding to the key word.

With reference to the second possible implementation manner of the first aspect, in a sixth possible implementation manner of the first aspect, when the acquiring an environmental background image is performed, the acquiring an environmental background image includes:
acquiring an environmental parameter, where the environmental parameter is a temperature, a humidity, or a wind power;

acquiring an environmental state according to the environmental parameter; and acquiring the environmental background image according to the environmental state.

With reference to the second possible implementation manner of the first aspect, in a seventh possible implementation manner of the first aspect, when the acquiring an environmental background image is performed, the acquiring an environmental background image includes:

acquiring a current geographic location of a user;

acquiring a weather condition according to the geographic location; and acquiring the environmental background image according to the weather condition.

With reference to the second possible implementation manner of the first aspect, in an eighth possible implementation manner of the first aspect, if the transmitted information is the text information, after the acquiring an image, the method further includes:

combining the text information and the image in the session.

With reference to the eighth possible implementation manner of the first aspect, in a ninth possible implementation manner of the first aspect, the combining the text information and the image includes:

inserting the image or the emoticon image corresponding to the key word into the text information.

With reference to the eighth possible implementation manner of the first aspect, in a tenth possible implementation manner of the first aspect, the combining the text information and the image includes:

displaying the text information in the session, and using the environmental background image as a background of the session.

According to a second aspect, an information transmission apparatus is provided, where the apparatus includes:

a session starting unit, configured to start a session between a terminal and a peer terminal;

a detection unit, configured to detect whether information transmitted in the session satisfies a trigger condition; and an image acquiring unit, configured to: if the information satisfies the trigger condition, acquire an image, and send the image to the peer terminal, where the information transmitted in the session includes text information or voice information.

With reference to the second aspect, in a first possible implementation manner of the second aspect, the detecting that the information transmitted in the session satisfies the trigger condition includes:

detecting that a speaking speed in the voice information is greater than or equal to a first threshold, or detecting that a speaking speed in the voice information is less than or equal to a second threshold, or detecting that an intonation in the voice information is greater than or equal to a third threshold, or detecting that an intonation in the voice information is less than or equal to a fourth threshold; and the image acquiring unit is further configured to capture a facial expression of a user.

With reference to the second aspect, in a second possible implementation manner of the second aspect, the detecting that the information transmitted in the session satisfies the trigger condition includes: detecting a key word in the text information, or detecting a key word in the voice information; and the image acquiring unit is further configured to acquire an emoticon image, or configured to acquire an image corresponding to the key word, or configured to acquire an environmental background image.

With reference to the first possible implementation manner of the second aspect or the second possible implementation manner of the second aspect, in a third possible implementation manner of the second aspect, when being configured to acquire an emoticon image, the image acquiring unit includes a first image acquiring unit, configured to acquire an emoticon image, where the first image acquiring subunit is further configured to capture a current facial expression of a user; and the first image acquiring subunit is further configured to acquire an emoticon image according to the facial expression.

With reference to the third possible implementation manner of the second aspect, in a fourth possible implementation manner of the second aspect, the first image acquiring subunit is further configured to analyze emotion corresponding to the facial expression; and the first image acquiring subunit is further configured to acquire a cartoon-form emoticon image corresponding to the emotion, or configured to generate, according to the emotion, a facial feature corresponding to the emotion, and add the facial feature to a preset facial image, to acquire an emoticon image.

With reference to the second possible implementation manner of the second aspect, in a fifth possible implementation manner of the second aspect, when being configured to acquire an image corresponding to the key word, the image acquiring unit includes a second image acquiring subunit, configured to search for an image according to the key word, where the second image acquiring subunit is further configured to acquire, according to the found image, an image corresponding to the key word.

With reference to the second possible implementation manner of the second aspect, in a sixth possible implementation manner of the second aspect, when being configured to acquire an environmental background image, the image acquiring unit further includes a third image acquiring subunit, configured to acquire an environmental parameter, where the environmental parameter is a temperature, a humidity, or a wind power;

the third image acquiring subunit is further configured to acquire an environmental state according to the environmental parameter, and the third image acquiring subunit is further configured to acquire the environmental background image according to the environmental state.

With reference to the second possible implementation manner of the second aspect, in a seventh possible implementation manner of the second aspect, when being configured to acquire an environmental background image, the image acquiring unit further includes a fourth image acquiring subunit, configured to acquire a geographic location of a user, where the fourth image acquiring subunit is further configured to acquire a weather condition according to the geographic location; and the fourth image acquiring subunit is further configured to acquire the environmental background image according to the weather condition.

With reference to the second possible implementation manner of the second aspect, in an eighth possible implementation manner of the second aspect, the apparatus further includes a combining unit, configured to: if the transmitted information is the text information, after the image is acquired, combine the text information and the image in the session.

With reference to the eighth possible implementation manner of the second aspect, in a ninth possible implementation manner of the second aspect, the combining unit includes a first combining subunit, configured to insert the image corresponding to the key word into the text information.

With reference to the eighth possible implementation manner of the second aspect, in a tenth possible implementation manner of the second aspect, the combining unit further includes a second combining subunit, configured to display the text information in the session, and use the environmental background image as a background of the session.

According to a third aspect, an information transmission device is provided, where the device includes:
- a processor, configured to start a session between a terminal and a peer terminal, where
- the processor is further configured to detect whether information transmitted in the session satisfies a trigger condition; and
- the processor is further configured to: if the information satisfies the trigger condition, acquire an image; and
- a transmitter, configured to send the image to the peer terminal, where
- the information transmitted in the session includes text information or voice information.

With reference to the third aspect, in a first possible implementation manner of the third aspect, the detecting that the information transmitted in the session satisfies the trigger condition includes:
- detecting that a speaking speed in the voice information is greater than or equal to a first threshold, or detecting that a speaking speed in the voice information is less than or equal to a second threshold, or detecting that an intonation in the voice information is greater than or equal to a third threshold, or detecting that an intonation in the voice information is less than or equal to a fourth threshold; and
- the processor is further configured to acquire an emoticon image.

With reference to the third aspect, in a second possible implementation manner of the third aspect, the detecting that the information transmitted in the session satisfies the trigger condition includes: detecting a key word in the text information, or detecting a key word in the voice information; and
- the processor is further configured to acquire an emoticon image, or acquire an image corresponding to the key word, or acquire an environmental background image.

With reference to the first possible implementation manner of the third aspect or the second possible implementation manner of the third aspect, in third possible implementation manner of the third aspect, when the acquiring an emoticon image is performed, the device further includes a camera, configured to capture a facial expression of a user under the control of the processor, where
- the processor is further configured to acquire, according to the facial expression, an image corresponding to the key word.

With reference to the second possible implementation manner of the third aspect, in a fourth possible implementation manner of the third aspect, the processor is further configured to analyze emotion corresponding to the facial expression; and
- the processor is further configured to acquire a cartoon-form emoticon image corresponding to the emotion, or generate, according to the emotion, a facial feature corresponding to the emotion, and add the facial feature to a preset facial image, to acquire an emoticon image.

With reference to the second possible implementation manner of the third aspect, in a fifth possible implementation manner of the third aspect, when the acquiring an image corresponding to the key word is performed, the processor is further configured to search for an image according to the key word; and
- the processor is further configured to acquire, according to the found image, an image corresponding to the key word.

With reference to the second possible implementation manner of the third aspect, in a sixth possible implementation manner of the third aspect, when the acquiring an environmental background image is performed, the processor is further configured to acquire an environmental parameter, where the environmental parameter is a temperature, a humidity, or a wind power;
- the processor is further configured to acquire an environmental state according to the environmental parameter; and
- the processor is further configured to acquire the environmental background image according to the environmental state.

With reference to the second possible implementation manner of the third aspect, in a seventh possible implementation manner of the third aspect, when the acquiring an environmental background image is performed, the processor is further configured to acquire a geographic location of a user;
- the processor is further configured to acquire a weather condition according to the geographic location; and
- the processor is further configured to acquire the environmental background image according to the weather condition.

With reference to the second possible implementation manner of the third aspect, in an eighth possible implementation manner of the third aspect, if the transmitted information is the text information, the processor is further configured to: after the image is acquired, combine the text information and the image in the session.

With reference to the eighth possible implementation manner of the third aspect, in a ninth possible implementation manner of the third aspect, the processor is further configured to insert the image corresponding to the key word into the text information.

With reference to the eighth possible implementation manner of the third aspect, in a tenth possible implementation manner of the third aspect, the processor is further configured to display the text information in the session, and use the environmental background image as a background of the session.

The embodiments of the present invention disclose an information transmission method, where after a session between a terminal and a peer terminal is started, it is detected whether information transmitted in the session satisfies a trigger condition, and if the information satisfies the trigger condition, an image is acquired, and the image is sent to the peer terminal, where the information transmitted in the session includes text information or voice information. According to the method in the present invention, an image can be automatically acquired without manual operation, which can better convey emotion of a user, and improve information transmission efficiency.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention below provide an information transmission method, which can improve information transmission efficiency.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
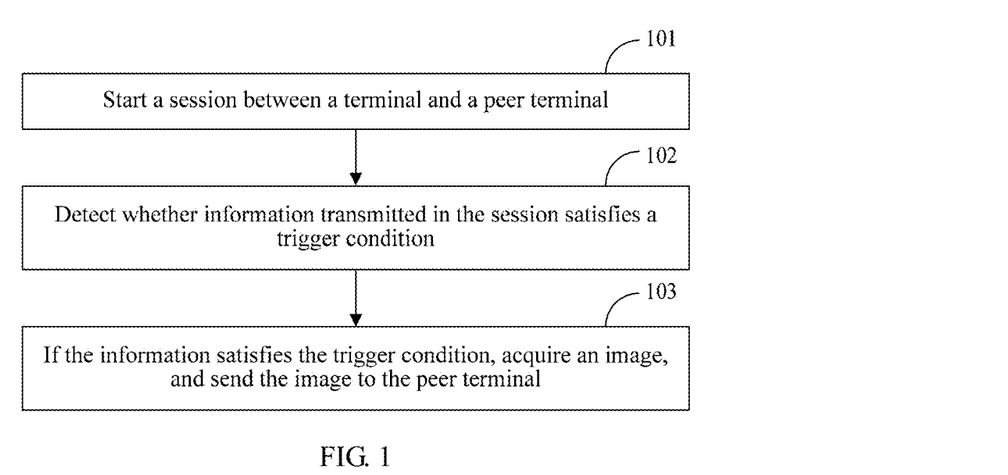
FIG. 1 is a flowchart of an information transmission method according to an embodiment of the present invention.

FIG. 1 is a flowchart of an information transmission method according to an embodiment of the present invention. As shown in FIG. 1, this embodiment of the present invention provides an information transmission method, including:

Step 101: Start a session between a terminal and a peer terminal.

Step 102: Detect whether information transmitted in the session satisfies a trigger condition.

Step 103: If the information satisfies the trigger condition, acquire an image, and send the image to the peer terminal, where the information transmitted in the session includes text information or voice information.

According to the information transmission method in this embodiment, an image is automatically acquired according to a trigger condition, where a user does not need to manually acquire an image, which is easy to operate, and can improve information transmission efficiency.

In another embodiment of the present invention, the detecting that the information transmitted in the session satisfies the trigger condition includes:

detecting that a speaking speed in the voice information is greater than or equal to a first threshold, or detecting that a speaking speed in the voice information is less than or equal to a second threshold, or detecting that an intonation in the voice information is greater than or equal to a third threshold, or detecting that an intonation in the voice information is less than or equal to a fourth threshold; and the acquiring an image includes acquiring an emoticon image.

The detecting that the information transmitted in the session satisfies the trigger condition includes: detecting a key word in the text information, or detecting a key word in the voice information; and the acquiring an image includes acquiring an emoticon image, or acquiring an image corresponding to the key word, or acquiring an environmental background image.

The key word may be a noun, an adjective, a verb, or a modal particle.

In the foregoing embodiment, the acquiring an emoticon image includes:

capturing a current facial expression of a user; and acquiring an emoticon image according to the facial expression.

The acquiring an emoticon image according to the facial expression includes:

analyzing emotion corresponding to the facial expression; and acquiring a cartoon-form emoticon image corresponding to the emotion, or generating, according to the emotion, a facial feature corresponding to the emotion, and adding the facial feature to a preset facial image, to acquire an emoticon image.

The analyzing emotion corresponding to the facial expression is mainly performed according to a main feature of a face, which includes but is not limited to features of an eye, a lip, a forehead, and the like. For example, turning corners of the lips up may indicate happy emotion, and wrinkling of skin on the forehead may indicate upset emotion.

If the emotion is happy, a cartoon-form emoticon image corresponding to "happy" may be acquired. A facial feature corresponding to "happy" may be added to a preset facial image. The preset facial image may be a facial image of an initiator of the session, or may be a preset facial image of another person.

When a user has a voice chat, an emoticon image may be displayed in a corresponding user interface in the session, or an emoticon image may be displayed in another session.

The emoticon image is acquired according to the speaking speed or the intonation in the voice or the key word in the voice information, so that when having a voice chat, the user can also see the emoticon image, which can better convey personal emotion of the user, and improve information transmission efficiency.

The acquiring an image includes acquiring an image corresponding to the key word.

The acquiring an image corresponding to the key word may be performed in multiple manners, and the acquiring an image corresponding to the key word in an embodiment of the present invention includes:

searching for an image according to the key word; and acquiring, according to the found image, an image corresponding to the key word.

In this embodiment, the key word may be a scenic spot name, such as "the Great Wall" or "the Summer Palace", or an article name, such as "kite" or "cake". The searching for an image according to the key word may be searching a web server, or may be searching a local image library. A size of the found image may be relatively large, it is probably that the image needs to be zoomed or cut, and a zoom ratio and a size to be cut may be preset, or the image may automatically adapt to a size of the session.

In an embodiment of the present invention, when the acquiring an environmental background image is performed, the acquiring an environmental background image includes:
  acquiring an environmental parameter, where the environmental parameter is a temperature, a humidity, or a wind power;
  acquiring an environmental state according to the environmental parameter; and
  acquiring the environmental background image according to the environmental state.

In another embodiment of the present invention, the acquiring an environmental background image includes:
  acquiring a current geographic location of a user;
  acquiring a weather condition according to the geographic location; and acquiring the environmental background image according to the weather condition.

If the transmitted information is the text information, after the acquiring an image, the method further includes:
  combining the text information and the image in the session.

The combining the text information and the image in the session includes:
  inserting the image or the emoticon image corresponding to the key word into the text information.

In this embodiment, the image corresponding to the key word is inserted behind the corresponding key word in the text information, or may be inserted in front of the corresponding key word in the text information.

The combining the text information and the image in the session includes:
  displaying the text information in the session, and using the environmental background image as a background of the session.

According to the method in this embodiment of the present invention, according to a key word in a text channel, an image corresponding to the key word is automatically acquired without manual operation, which is easy and convenient to operate, and can better convey emotion of a user, provide better use experience for the user, and improve information transmission efficiency.

Figure 2:
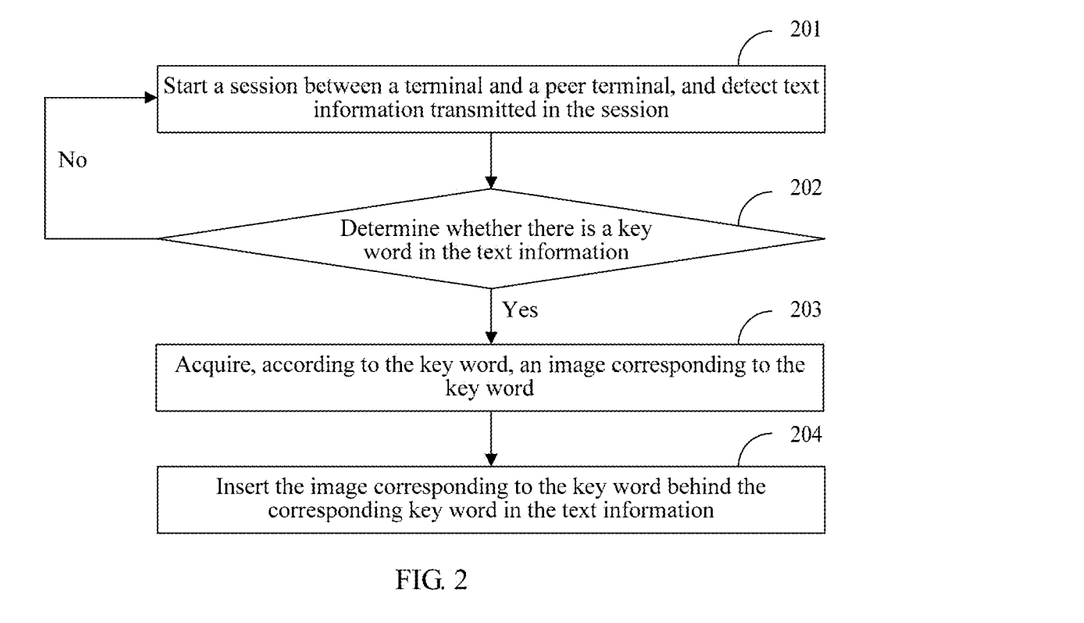
FIG. 2 is a flowchart of an information transmission method according to an embodiment of the present invention.

FIG. 2 is a flowchart of a transmission method according to an embodiment of the present invention. In the method shown in FIG. 2, information transmitted in a session is text information. As shown in FIG. 2, the method includes:
  Step 201: Start a session between a terminal and a peer terminal, and detect text information transmitted in the session.
  Step 202: Determine whether there is a key word in the text information, and if yes, perform step 203; or if not, go back to step 201.
  Step 203: Acquire, according to the key word, an image corresponding to the key word.
  Step 204: Insert the image corresponding to the key word behind the corresponding key word in the text information.

According to the method in this embodiment of the present invention, according to a key word in text information in a session, an image corresponding to the key word is automatically acquired or an environmental background image is acquired without manual operation, which is easy and convenient to operate, and can better convey emotion of a user, provide better use experience for the user, and improve information transmission efficiency.

Figure 3:
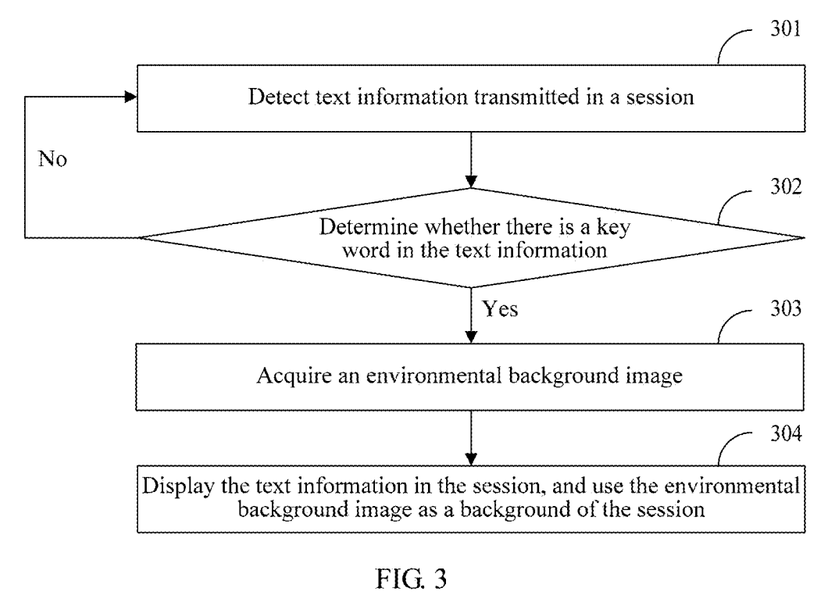
FIG. 3 is a flowchart of an information transmission method according to an embodiment of the present invention.

FIG. 3 is a flowchart of a transmission method according to an embodiment of the present invention. In the method shown in FIG. 3, information transmitted in a session is text information. As shown in FIG. 3, the method includes:
  Step 301: Detect text information transmitted in a session.
  Step 302: Determine whether there is a key word in the text information, and if yes, perform step 303; or if not, go back to step 301.
  Step 303: Acquire an environmental background image.
  Step 304: Display the text information in the session, and use the environmental background image as a background of the session.

According to the method in this embodiment of the present invention, an environmental background image is automatically acquired according to a key word in a text channel without manual operation, which is easy and convenient to operate, and can better convey emotion of a user, provide better use experience for the user, and improve information transmission efficiency.

Figure 4:
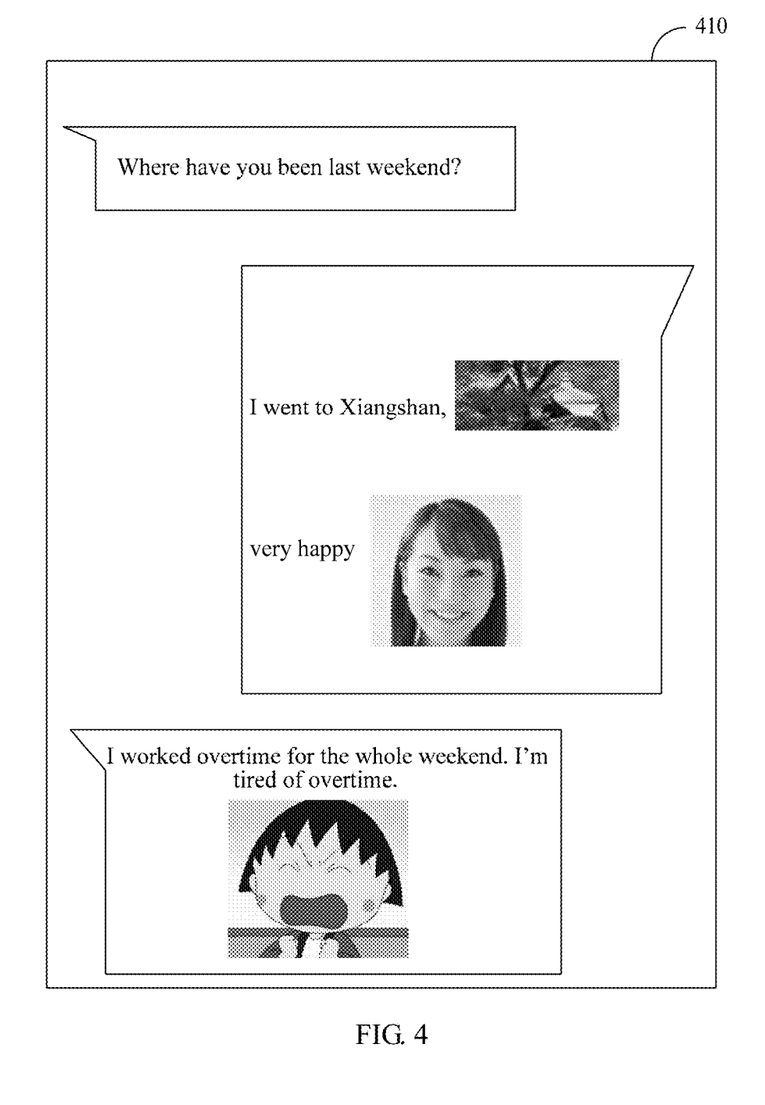
FIG. 4 is a schematic diagram of an application scenario of an information transmission method according to an embodiment of the present invention.

FIG. 4 is a schematic diagram of an application scenario of an information transmission method according to an embodiment of the present invention. As shown in FIG. 4, 401 is a user interface of a session. In the application scenario shown in FIG. 4, information transmitted in the session is text information.

Image acquisition is a background operation, and is invisible to a user. A text and an image that are displayed in the user interface of the session are visible to the user.

When the user chats by using a text, the text is displayed in the session. In FIG. 4, content of the text chat of the user is displayed in a manner of small bubbles.

When the user chats currently, after a key word "Xiangshan" is detected in the text, a search is started, and a picture of Xiangshan is found. After being cut and compressed, an image corresponding to Xiangshan is acquired and inserted behind the word "Xiangshan" in the text. After "happy" is detected, a current facial expression of the user is captured by a camera. An image corresponding to "happy" is acquired according to the facial expression, and the image is inserted behind the word "happy" in the text.

The chat goes on. The other user mentions a word "upset" during the chat. After "upset" is detected, a current facial expression of the user is captured by a camera. Corresponding motion is analyzed according to the current facial expression. Brows of the user wrinkle. It is analyzed that the current emotion of the user is "upset", a cartoon-form emoticon corresponding to "upset" is searched for, and the cartoon emoticon is used as an emoticon image of the user. The emoticon image is inserted behind the word "upset" in a text. The session user interface is finally displayed as shown in FIG. 4.

According to the method in this embodiment of the present invention, an image is acquired without manual operation, which is easy and convenient to operate, and can better convey emotion of a user, provide better use experience for the user, and improve information transmission efficiency.

Figure 5:
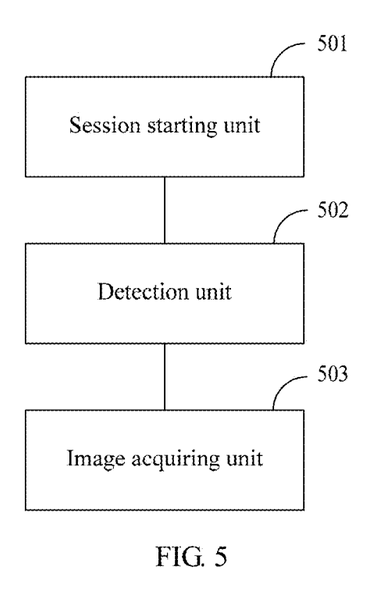
FIG. 5 is a schematic structural diagram of an information transmission apparatus according to an embodiment of the present invention.

Corresponding to the foregoing method embodiments, an embodiment of the present invention further provides a transmission apparatus. FIG. 5 is a schematic structural diagram of an information transmission apparatus according to an embodiment of the present invention. As shown in FIG. 5, the apparatus includes:
  a session starting unit 501, configured to start a session between a terminal and a peer terminal;

a detection unit 502, configured to detect whether information transmitted in the session satisfies a trigger condition; and an image acquiring unit 503, configured to: if the information satisfies the trigger condition, acquire an image, and send the image to the peer terminal, where the information transmitted in the session includes text information or voice information.

According to the transmission apparatus in this embodiment of the present invention, operation is easy and convenient, better use experience is provided for a user, and information transmission efficiency is improved.

The detecting, by the detection unit 502, that the information transmitted in the session satisfies the trigger condition includes:

detecting that a speaking speed in the voice information is greater than or equal to a first threshold, or detecting that a speaking speed in the voice information is less than or equal to a second threshold, or detecting that an intonation in the voice information is greater than or equal to a third threshold, or detecting that an intonation in the voice information is less than or equal to a fourth threshold; and the image acquiring unit 503 includes a first acquiring subunit, configured to capture a facial expression of a user.

The detecting, by the detection unit 502, that the information transmitted in the session satisfies the trigger condition includes: detecting a key word in the text information, or detecting a key word in the voice information; and the image acquiring unit 503 is further configured to acquire an emoticon image, or configured to acquire an image corresponding to the key word, or configured to acquire an environmental background image.

When being configured to acquire an emoticon image, the image acquiring unit 503 includes a first image acquiring unit, configured to acquire an emoticon image, where the first image acquiring subunit is further configured to capture a current facial expression of a user; and the first image acquiring subunit is further configured to acquire an emoticon image according to the facial expression.

The image acquiring unit 503 further includes a third image acquiring subunit, configured to acquire an environmental background image.

The first image acquiring subunit is further configured to analyze emotion corresponding to the facial expression; and the first image acquiring subunit is further configured to acquire a cartoon-form emoticon image corresponding to the emotion, or configured to generate, according to the emotion, a facial feature corresponding to the emotion, and add the facial feature to a preset facial image, to acquire an emoticon image.

When the image acquiring unit 503 is configured to acquire an image corresponding to the key word, the image acquiring unit further includes a second image acquiring subunit, configured to search for an image according to the key word, where the second image acquiring subunit is further configured to acquire, according to the found image, an image corresponding to the key word.

When being configured to acquire an environmental background image, the image acquiring unit 503 further includes a third image acquiring subunit, configured to acquire an environmental parameter, where the environmental parameter is a temperature, a humidity, or a wind power;

the third image acquiring subunit is further configured to acquire an environmental state according to the environmental parameter; and the third image acquiring subunit is further configured to acquire the environmental background image according to the environmental state.

When being configure to acquire an environmental background image, the image acquiring unit 503 further includes a fourth image acquiring subunit, configured to acquire a geographic location of a user, where the fourth image acquiring subunit is further configured to acquire a weather condition according to the geographic location; and the fourth image acquiring subunit is further configured to acquire the environmental background image according to the weather condition.

The apparatus further includes a combining unit, configured to: if the transmitted information is the text information, after the image is acquired, combine the text information and the image in the session.

The combining unit includes a first combining subunit, configured to insert the image corresponding to the key word into the text information.

The combining unit further includes a second combining subunit, configured to display the text information in the session, and use the environmental background image as a background of the session.

According to the transmission apparatus in this embodiment of the present invention, an image can be automatically acquired without manual operation, which is easy and convenient to operate, provides better use experience for a user, and improves information transmission efficiency.

An embodiment of the present invention further provides an information transmission device, where the device includes:

a processor, configured to start a session between a terminal and a peer terminal, where the processor is further configured to detect whether information transmitted in the session satisfies a trigger condition; and the processor is further configured to: if the information satisfies the trigger condition, acquire an image; and a transmitter, configured to send the image to the peer terminal, where the information transmitted in the session includes text information or voice information.

The detecting that the information transmitted in the session satisfies the trigger condition includes:

detecting that a speaking speed in the voice information is greater than or equal to a first threshold, or detecting that a speaking speed in the voice information is less than or equal to a second threshold, or detecting that an intonation in the voice information is greater than or equal to a third threshold, or detecting that an intonation in the voice information is less than or equal to a fourth threshold, or detecting a key word in the voice information; and the processor is further configured to acquire an emoticon image.

The detecting that the information transmitted in the session satisfies the trigger condition includes: detecting a key word in the text information, or detecting a key word in the voice information; and the processor is further configured to acquire an emoticon image, or acquire an image corresponding to the key word, or acquire an environmental background image.

When the acquiring an emoticon image is performed, the device further includes a camera, configured to capture a facial expression of a user under the control of the processor, where the processor is further configured to acquire, according to the facial expression, an image corresponding to the key word.

The processor is further configured to analyze emotion corresponding to the facial expression; and the processor is further configured to acquire a cartoon-form emoticon image corresponding to the emotion, or generate, according to the emotion, a facial feature corresponding to the emotion, and add the facial feature to a preset facial image, to acquire an emoticon image.

When the acquiring an image corresponding to the key word is performed, the processor is further configured to search for an image according to the key word; and the processor is further configured to acquire, according to the found image, an image corresponding to the key word.

When the acquiring an environmental background image is performed, the processor is further configured to acquire an environmental parameter, where the environmental parameter is a temperature, a humidity, or a wind power;

the processor is further configured to acquire an environmental state according to the environmental parameter; and the processor is further configured to acquire the environmental background image according to the environmental state.

When the acquiring an environmental background image is performed, the processor is further configured to acquire a geographic location of a user;

the processor is further configured to acquire a weather condition according to the geographic location; and the processor is further configured to acquire the environmental background image according to the weather condition.

If the transmitted information is the text information, the processor is further configured to: after the image is acquired, combine the text information and the image in the session.

The processor is further configured to insert the image corresponding to the key word into the text information.

The processor is further configured to display the text information in the session, and use the environmental background image as a background of the session.

According to the transmission device in this embodiment of the present invention, an image can be automatically acquired without manual operation, which is easy and convenient to operate, provides better use experience for a user, and improves information transmission efficiency.

The embodiments of the present invention disclose an information transmission method, a transmission apparatus, and a transmission device, where an image can be automatically acquired without manual operation, which is easy and convenient to operate, provides better use experience for a user, and improves information transmission efficiency.

It may be clearly understood by persons skilled in the art that technologies in the embodiments of the present invention may be implemented by software plus necessary universal hardware, where the universal hardware includes a universal integrated circuit, a universal CPU, a universal memory, a universal device, and the like, and definitely may be implemented by application-specific hardware, like an application-specific integrated circuit, an application-specific CPU, an application-specific memory, an application-specific device, and the like, but in many cases, the former one is preferred. Based on such an understanding, the technical solutions of the present invention essentially or the part contributing to the prior art may be implemented in a form of a software product. The software product is stored in a storage medium, such as a read-only memory (ROM, Read-Only Memory), a random access memory (RAM, Random Access Memory), a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method performed by a mobile terminal, comprising:

starting a chat session with a peer mobile terminal, wherein the chat session is presented in a user interface of a chat application;

when the chat session is presented in the user interface of the chat application:

detecting a first input of a user of the mobile terminal;

displaying first text information corresponding to the first input in the chat session in response to detecting the first input, wherein the first text information is sent to a peer mobile terminal, and wherein the first text information is presented in a first bubble in the user interface of the chat application;

detecting a second input of the user of the mobile terminal;

displaying a second text information corresponding to the second input in the chat session in response to detecting the second input, wherein the second text information is sent to the peer mobile terminal, and wherein the second text information is presented in a second bubble in the user interface of the chat application;

automatically turning on a camera of the mobile terminal;

capturing a facial expression of the user via the camera;

obtaining facial features in the facial expression of the user;

combining the facial features with at least one preset cartoon-form facial image to generate at least one emoticon image, wherein the facial features comprises all of a feature of an eye, a feature of a lip, and a feature of a forehead, wherein the at least one emoticon image comprises a first emoticon image generated from a first preset cartoon-form facial image and a second emoticon image generated from a second preset cartoon-form facial image, wherein the first emoticon image comprises features of corners of a mouth of the user curving up, and wherein the second emoticon image comprises features of a wrinkled skin of a forehead of the user;

displaying a combination of the first text information and the first emoticon image in the first bubble;

displaying a combination of the second text information and the second emoticon image in the second bubble;

acquiring a current geographic location of the mobile terminal;

acquiring a weather condition according to the geographic location;

acquiring an environmental background image according to the weather condition;

displaying the environmental background image behind a text of the first bubble and behind a text of the second bubble; and sending the environmental background image to the peer mobile terminal so as to enable the environmental background image to be displayed behind a text of the first bubble and behind a text of the second bubble at the peer mobile terminal.

2. The method according to claim 1, wherein the camera of the mobile terminal is automatically turned on in response to:

detecting that a speaking speed of the user is greater than a first threshold;

detecting that a speaking speed of the user is less than a second threshold;

detecting that an intonation of the user is greater than a third threshold; or detecting that an intonation of the user is less than a fourth threshold.

3. The method according to claim 1, wherein the camera of the mobile terminal is automatically turned on in response to:

detecting an occurrence of a key word in the first text information corresponding to the first input; or detecting an occurrence of the key word in the second text information corresponding to the second input.

4. The method according to claim 1, wherein the at least one preset cartoon-form facial image is searched in a web server or in a local image library of the mobile terminal.

5. The method according to claim 1, wherein the at least one preset cartoon-form facial image is adjusted to adapt to a size of the user interface of the chat application.

6. A mobile terminal comprising:

a memory comprising instructions; and a processor coupled to the memory, wherein the instructions are executed by the processor to cause the mobile terminal to:

start a chat session with a peer mobile terminal, wherein the chat session is presented in a user interface of a chat application;

when the chat session is presented in the user interface of the chat application:

detect a first input of a user;

display a first text information corresponding to the first input in the chat session in response to detecting the first input, wherein the first text information is sent to the peer mobile terminal, and wherein the first text information is presented in a first bubble in the user interface of the chat application;

detect a second input of the user;

display a second text information corresponding to the second input in the chat session in response to detecting the second input, wherein the second text information is sent to the peer mobile terminal, and wherein the second text information is presented in a second bubble in the user interface of the chat application;

automatically turn on a camera of the mobile terminal;

capture a facial expression of the user of the mobile terminal via the camera;

obtain facial features of the facial expression;

combine the facial features with at least one preset cartoon-form facial image to generate at least one emoticon image, wherein the facial features comprise all of a feature of an eye, a feature of a lip, and a feature of a forehead, wherein the at least one emoticon image comprises a first emoticon image generated from a first preset cartoon-form facial image and a second emoticon image generated from a second preset cartoon-form facial image, wherein the first emoticon image comprises features of corners of a mouth of the user curving up, and wherein the second emoticon image comprises features of a wrinkled skin of a forehead of the user;

display a combination of the first text information and the first emoticon image in the first bubble;

display a combination of the second text information and the second emoticon image in the second bubble;

acquire a current geographic location of the mobile terminal;

acquire a weather condition according to the geographic location;

acquire an environmental background image according to the weather condition;

display the environmental background image behind a text of the first bubble and behind a text of the second bubble; and send the environmental background image to the peer mobile terminal so as to enable the environmental background image to be displayed behind a text of the first bubble and behind a text of the second bubble at the peer mobile terminal.

7. The mobile terminal according to claim 6, wherein the camera of the mobile terminal is automatically turned on in response to:

detecting that a speaking speed of the user is greater than a first threshold;

detecting that a speaking speed of the user is less than a second threshold;

detecting that an intonation of the user is greater than a third threshold; or detecting that an intonation of the user is less than a fourth threshold.

8. The mobile terminal according to claim 6, wherein the instructions are executed by the processor to further cause the mobile terminal to:

detect an occurrence of a key word in the first text information corresponding to the first input; or detect an occurrence of the key word in the second text information corresponding to the second input.

9. The mobile terminal according to claim 6, wherein the at least one preset cartoon-form facial image is searched in a web server or in a local image library of the mobile terminal.

10. The mobile terminal according to claim 9, wherein the at least one preset cartoon-form facial image is adjusted to adapt to a size of the user interface of the chat application.

\* \* \* \* \*